United States Patent [19]
Lee

[11] Patent Number: 5,872,175
[45] Date of Patent: Feb. 16, 1999

[54] POLYAMIDE RESIN COMPOSITION

[75] Inventor: Byung Jin Lee, Ulsan, Rep. of Korea

[73] Assignee: Hyundai Mortor Company, Seoul, Rep. of Korea

[21] Appl. No.: 889,823

[22] Filed: Jul. 8, 1997

[51] Int. Cl.$^6$ ...................................................... C08K 3/00
[52] U.S. Cl. ........................... 524/494; 525/420; 525/432
[58] Field of Search ............................ 524/494; 525/432, 525/420

[56] References Cited

U.S. PATENT DOCUMENTS 5,500,473  3/1996  Wissmann ................................ 524/447

*Primary Examiner*—Edward J. Cain
*Attorney, Agent, or Firm*—Finnegan, Henderson, Farabow, Garrett & Dunner, L.L.P.

[57] ABSTRACT

This invention relates to a polyamide resin composition and more particularly, to a polyamide resin composition exhibiting better improved mechanical strength and gasoline-resisting property under thermally severe conditions, when a specifically formulated polyamide resin complex comprising a glassfiber whose surface is treated with coupling agent and organic nucleic agent in the form of phosphoric acid-metal salt, is applied to some automobile parts such as a delivery pipe, being directly contacted with gasoline, automobile fuel.

3 Claims, No Drawings

POLYAMIDE RESIN COMPOSITION

FIELD OF THE INVENTION

This invention relates to a polyamide resin composition and more particularly, to a polyamide resin composition exhibiting better improved mechanical strength and gasoline-resisting property under thermally severe conditions, when a specifically formulated polyamide resin complex comprising a glassfiber whose surface is treated with coupling agent and organic nucleating agent in the form of phosphoric acid-metal salt, is applied to some automobile parts such as a delivery pipe, being directly contacted with gasoline, automobile fuel.

BACKGROUND OF THE INVENTION

A delivery pipe is a peripheral part of engine. However, the conventional delivery pipe, mainly prepared by a method of aluminium dye casting, has recognized several disadvantages in that a) manufacturing process is complicated, b) the weight of a product is increasing, and c) when metal materials are applied, their heat conduction is large and then, increasing gasoline temperature of the pipe plays a role to increase a total internal pressure within a fuel system, thus leading to reduction of engine efficiency and environmental problems due to gasoline discharge.

In order to comply with the aforementioned problems the conventional delivery pipe face, i.e., a) more simplified manufacturing process, b) reduced weight of product, c) enhancement of engine efficiency, and d) prevention of gasoline discharge, therefore, it is advisable to use plastic materials. The first priority for plastication of the delivery pipe should be placed on mechanical durability such as strength and rigidity, when metal materials are replaced and in addition to that, on impact-resistance and vibration-resisting properties during the driving. Further, since gasoline fuel is always filled within the delivery pipe, metal-substitute materials should be selected from gasoline-resisting ones, which may minimize the discharging amount of gasoline to the outside via internal walls of the pipe.

In order to meet the above requirements, the conventional metal materials used in a delivery pipe may be replaced by a resin such as polyamide resin, one of the engineering plastics. Since the common polyamide resin within its molecules contains amide group having a strong binding force, it exhibit a high melting point and remarkable mechanical strength. Among the engineering plastics, polyamide resin is a material with a wide scope of use and recently, it has been widely used in some parts of automobiles, electrics and electronics.

In particular, in parallel with the recent trends of favoring smaller automobiles, the demand for polyamide resin has been on a drastic increase. Now that much attention has focused on the additional properties of polyamide resin together with basic advantages, the development of novel polyamide materials is now in very active status.

When the conventional polyamide resin is applied as an automobile part, its most common manufacturing process is that after mixing the polyamide resin with various types of polyolefin resin, the polyolefin resin in fibrous or tabular form is present in the product and several layers with different properties exist towards the direction of the product, thus having a resistance against the infiltration or penetration of gasoline. Further, another method designed to enhance the resistance against gasoline has been suggested in such a manner that with the addition of a polar resin such as polyvinyl acetate to the polyamide, more large resistance may be induced by the penetration of non-polar gasoline. However, the above method has recognized some disadvantages in applying peripheral parts of engine, since the addition of components having a poor thermal stability resulted in unstable heat resistance or reduced mechanical strength at high temperature. To overcome the poor thermal stability, some reinforcing agents (e.g., glassfiber or mineral) have been added so as to improve a thermal deformation temperature and bending strength but when these agents are applied, the gasoline-resisting property, being obtained from non-reinforcing materials, is not expected due to the fact that the multilayer structure having remarkable penetration effects is destroyed.

The main reasons why the parts manufactured by glassfiber-reinforced polyamide resin shows their poor infiltration against gasoline is that 1) if there are a poor adhesive force in the interface between glassfiber and polyamide resin, gasoline vapor become diffused from the resulting interfacial crevices, and 2) gasoline, which is infiltrated into the amorphous areas of polyamide resin is delivered.

The aforementioned reasons have supported the following hypothesis in that the poor adhesive power in the interface can be ascertained by weight gains or reduced strength due to infiltration of gasoline; and in the case of second factor, the gasoline-resisting property may be increased, when the degree of crystallization of polyamide resin components using a crystal nucleating agent.

During these experiments, it has been ascertained that the improvement of gasoline-resisting property has been made available when a resin of same composition is injected at somewhat low temperature and in parallel with increase of injection rate even at a same resin temperature. As a result of analyzing the above matter, it has been noted that from the common parts where the resin flow occurs towards the rectangular direction of the product thickness, better gasoline-resisting property has been induced by enhanced orientation of glassfiber more than in the case of somewhat reduced orientation. Based upon such results, the inventor et al. have performed various experiments designed to enhance the orientation degree of glassfiber in terms of resin's own properties instead of injection conditions.

In order to enhance the orientation of glassfiber followed by increasing the viscosity of polyamide resin, therefore, experiments for the enhancement of viscosity have been performed using various types of additives via their reaction with the amine or carboxyl terminal of polyamide but the improvement of gasoline-resisting property has not eventually been shown. The inventor et al. has concluded that such poor gasoline-resisting property may occur, since the reaction of molecular terminals reduced the. crystallization of polyamide resin components and gasoline is infiltrated into the amorphous areas and thus, have completed this invention with the following conclusion that a method of using plural polyamide resins with different properties of melting flow is the most useful in improving the gasoline-resisting property, instead of a method to improve the viscosity via reaction of terminal groups.

In an effort to provide the polyamide resin with thermal stability, the inventor et al. has performed extensive studies Lo overcome the poor gasoline-resisting property induced by adding glassfiber as a reinforcing agent and in consequence, have successfully the polyamide resin composition having improved gasoline-resisting property by dint of enhancement of orientation degree of glassfiber using plural polyamide resins with different properties of melting flow.

SUMMARY OF THE INVENTION

An object of this invention is to provide a polyamide resin composition exhibiting the superior mechanical strength and gasoline-resisting property simultaneously at an engine room of automobile or under thermally severe conditions.

This invention is explained in more detail as set forth hereunder.

This invention relates to the polyamide resin composition characterized in that glassfiber and organic nucleating agent are added to polyamide resin; 25~60 weight part of glassfiber and 0.03~1.0 weight part of organic nucleating agent are contained in proportion to 100 weight part of the polyamide resin comprising 60~70 weight % of polyamide-6 resin having a relative viscosity of 2.2~2.8 at room temperature, 20~30 weight % of polyamide-6 resin having a relative viscosity of 3.2~3.6 and 3~10 weight % of polyamide-6,6 resin having a relative viscosity of 2.5~3.5.

DETAILED DESCRIPTION OF PREFERRED EMBODIMENTS

This invention is further explained in more detail as set forth hereunder.

This invention relates to the polyamide resin composition for a delivery pipe designed for reinforcing the mechanical strength with addition of a glassfiber and at the same time, for improving the gasoline-resisting property, wherein the mucosity of a polyamide resin is adjusted in such a manner as defined above, so as to improve the gasoline-resisting property.

According to this invention, the polymerization degree of the polyamide-6 resin having a relative viscosity of 3.2~3.6 has higher than that of general polyamide resins; it contributes to increasing the viscosity of a final resin composition, thus assisting the orientation of a glassfiber and causing no reduction in any physical property, since it maintains a good compatibility with polyamide-6 resin having a relative viscosity of 2.2~2.8 and the largest portion in the resin composition.

If the contents of polyamide resin component, being a relatively high viscosity (3.2~3.6), are less than 20 weight % to the total polyamide resin composition, less improved effects of desired viscosity do not contribute much to the orientation of a glassfiber so that any improvement on the gasoline-resisting property may not be expected. If the contents of polyamide resin component exceed 30 weight %, however, there will be a sharp increase of total viscosity in the resin and the following shortcomings may occur: a) when glassfiber, reinforcing agent, is added to the resin, superior interfacial characteristics may not easily occur in a interface with the above reinforcing agent, b) the increase of viscosity may reduced the physical property of a final injection molding product and to overcome the above problem, the injection temperature should be readjusted upward during injection process and thus, reduced viscosity of the resin composition will make it more difficult to anticipate more enhanced orientation of glassfiber.

Further, a small amount of polyamide-6,6 resin has a higher crystal melting point and crystallization temperature when cooled, compared with polyamide-6 component. Therefore, the polyamide-6,6 resin exhibits a fast hardening and crystallization rate at the surface of molding when injected, and the surface of a final product is very clean with a relative higher crystallity; in addition to that, the polyamide-6,6 resin prevents any shortcomings associated with the appearance of glassfiber at the surface, which results in having extremely high gasoline-resisting effects at the areas contacted with gasoline.

If the contents ol polyamide-6,6 resin are less than 3 weight % to the tolal resin composition, less improvement in viscosity contributes little to the orientation of glassfiber and any improvement of gasoline-resisting property is not be expected; In case of exceeding 10 weight %, there will be a sharp increase in the viscosity of total resins and when some reinforcing agents (e.g., glassfiber) are added to the resin, better interfacial property at the interfaces with the reinforcing agents cannot be manifested and the viscosity increase results in lowering the physical property of a final product If the contents of polyamide-6 resin (relatively low viscosity: (2.2~2.8) are less than 60 weight % to the total resin composition, less improvement in viscosity contributes little to the orientation of glassfiber and any improvement of gasoline-resisting property is not be expected; In case of exceeding 70 weight %, there will be a sharp increase in the viscosity of total resins and when some reinforcing agents (e.g., glassfiber) are added to the resin, better interfacial property at the interfaces with the reinforcing agents cannot be manifested and the viscosity increase results in lowering the physical property of a final product.

For a glassfiber applicable to this invention, the product whose surface is treated with a aminosilane coupling agent may be generally utilized in order that when a glassfibers is added to the common polyamide resin, their interfacial adhesive force with polyamide resin may be superior. The length of a glassfiber is cut within about 3 mm and its diameter with about 10~15 $\mu$m. If the interfacial adhesive force of a glassfiber is superior, its selection has little limitation for use and such interfacial adhesive force may be easily judged by observing destroyed sites by impact.

Further, the reason why the orientation of glassfiber affects the infiltration or penetration of gasoline can be found in that;

Through observation of very smallest structure, the border line between polyamide resin and glassfiber treated with a coupling agent is generally bonded by chemical reactions and then, crystals may not be easily formed by the molecules, so bonded by such chemical reactions. Naturally, the diffusing rate of gasoline vapor in the amorphous interface is relatively fast and this will be susceptible to the infiltration of gasoline. However, in the event that a glassfiber whose surface is untreated so as not to prevent any chemical reactions, there are some interfacial gaps between glassfiber and polyamide resin and the gasoline vapor via such gaps will be diffused without any resistance, thus making the gasoline-resisting property poor sharply. On the above ground, a glassfiber whose surface is treated should be inevitably used, even though there exists a case of performing any chemical reaction.

Under the circumstances where the interface of glassfiber functions as an infiltration route of gasoline, the orientation degree of glassfiber becomes reduced; if the orientation degree exists towards the direction of product thickness, the infiltration rate of gasoline towards the direction of product thickness is faster than that in the case where a glassfiber is oriented towards direction of product length, being perpendicular to the thickness. Thus, the orientation of glassfiber towards product length functions as one of very important factors.

Further, the typical characteristics derived from such orientation of glassfiber arc the differences in a percentage of contraction between the flow direction and rectangular direction of the flow. In case of a common polyamide-6 reinforced with 50% glassfiber, the percentage of contraction between the flow direction and perpendicular direction are recorded as about 0.25% and about 0.33%. In contrast to this, when the orientation of glassfiber according to this invention is enhanced, the percentage of contraction between the flow direction and perpendicular direction are recorded as about 0.22% and about 0.38%; towards the flow direction, the percentage of contraction is reduced and towards the thickness direction, rectangular direction of the flow, the anisotropy becomes increased. Therefore, the observation of phenomena enables us to indirectly perceive the orientation of glassfiber in more accurate manner. Further, in case of a delivery pipe having a long length, its thickness direction is generally towards the rectangular direction of the flow, it is well understood that the orientation of glassfiber functions very effective prevention for the penetration of gasoline.

Further, phosphoric acid-metal salts used as the organic nucleic agents of this invention exhibit superior physical properties including gasoline resistance, when compared with compared with the common inorganic nucleic agents.

In general, nucleic agents are classified into some inorganic materials (e.g., titanium dioxide (TiO2), talc, silica, etc.), organic materials (e.g., aliphatic ester compounds, etc.), and organic materials in the form of phosphoric acid-metal salt used for this invention. In order to simultaeously improve the mechanical strength and gasoline-resisting property according to this invention, the organic nucleic agent in the form of phosphoric acid-metal salt can exhibit the most remarkable effects among the nucleic agents.

In case of the inorganic nucleic agents, the size and distribution of crystal nucleus generated by their dispersion are inhomogeneous so that their impact strengths become quite poor. In contrast, the organic nucleic agent in the form of phosphoric acid-metal salt retains its superior dispersion, whereby the crystallization degree of a final resin may be effectively be increased. Further, very small and homogeneous size of crystals enhance the crystallization degree of pure resin contained in the glassfiber, thus reducing the amorphous areas where gasoline may be easily infiltrated and complicating the diffused routes of gasoline vapor along the border line of small and homogeneous crystals. If this being the case, the infiltration or penetration of gasoline is not easily made available, which results in sharp improvement in the gasoline-resisting property.

Further, since the organic nucleic agent in the form of phosphoric acid-metal salt may further enhance various physical properties of the polyamide resin composition such as impact strength despite its small amount, it is a very useful for the embodiment of this invention.

According to this invention, the most desirable organic nucleic agent in the form of phosphoric acid-metal salt includes sodium 2,2'-methylenebis(4,6-di-tertiary-butylphenyl)phosphate or sodium di(4-tertiary-butylphenyl) phosphate, and it is preferred to use 0.03~1.0 weight part of organic nucleic agent to 100 weight part of the total polyamide resin composition. If the contents are less than 0.03 weight part, improvement in crystallization degree may not be expected and in case of exceeding 1.0 weight part, the enhancement of crystallization degree in proportion to the gradual increase of nucleic agent is not manifested, which is uneconomical and there are risks that the thermal stability may be reduced due to excessive addition of organic nucleic agent.

According to this invention, the following materials may be further used in addition to the above composition: common mold releases in the form of metal salt such as stearic acid, lauric acid, etc.; various heat-resisting materials or antioxidant to remove peroxides or radicals generated from oxidative heat degradation; weather-resisting agents to absorb or prevent ultraviolet; anti-charge agent or coloring agents such as dye or carbon black; plasticizers.

As mentioned in the above, the polyamide resin composition of this invention has the following advantages in that a) since plural polyamide resins having different viscosities are used, the surface is clear, b) since the orientation degree of glassfiber towards the length direction is enhanced, the composition of this invention exhibits very high resistance against the infiltration or penetration of gasoline in the interfaces between glassfiber and polyamide resin, c) since the infiltrating or penetrating route of gasoline into the resin areas is extended by reduction in ratios of amorphous areas and crystal sizes at the resin areas, the infiltration or penetration rate of gasoline may be reduced, and d) in particular, since the high-crystallity polyamide-6,6 layer present in the surface minimizes the appearance of glassfiber and inhibits the infiltrating amounts of directly contacted gasoline into automobile parts at the first stage, the gasoline-resisting property may be much improved. Further, the resin composition of this invention may be applicable to some automobile-fuel induction conduits. In general, since these products have quite long length over diameter or scope and the percentage of molding contraction towards the length direction is lower than that of common reinforcing materials such as glassfiber, the above points may be deemed advantageous in the design of a product.

This invention is explained in more detail by the following examples, but the claims are not limited to these examples.

EXAMPLE 1

To a complex polyamide resin comprising weight % of polyamide-6(A1) 70 having a relative viscosity of 2.6 and 23 weight % of polyamide-6(A2) having a relative viscosity of 3.4 (prepared by the method of formic acid) and 7 weight % of polyamide-6,6(A3) having a relative viscosity of 2.6 (prepared by the method of sulfuric acid), added to 100 weight part of the resin composition were 40 weight part of glassfiber(B, diameter: 13 $\mu$m, length: 3 mm) whose surface was treated with a aminosilane coupling agent, 0.3 weight part of sodium di(4-tertiary-butylphenyl)phosphate(C1) as an organic nucleic agent, 0.3 weight part of N,N'-hexamethylene-bis-(3,5-di-tertiary-butyl-4-hydroxyamide), a heat-resisting material as other additives, and 0.2 weight partethylen-bis-stearimide as a mold release. Then, a resin composition was prepared at 270° C. using heat-melting mixing apparatus in a twin screw type. The resin composition was released in the form of spaghetti via dye, cooled, and cut by a cutter to prepare a compounded chip. The chip was dried by anti-humidity hot-air dryer at 85° C. for 6 hours and injected molded at the resin temperature of 280° C. and molding temperature of 90° C. via an injection molding machine having mold opening force of 150 ton.

EXAMPLES 2~5 and comparative examples 1~11

These examples were performed in the same procedure as the above example 1, except for different contents of polyamide resin composition, revealed in the following table 1.

TABLE 1

| Example | Resin (weight %) A1(1) | A2(2) | A3(3) | Inactive ingredient (weight part) B(4) | C1(5) | C2(6) |
|---|---|---|---|---|---|---|
| 1 | 70 | 23 | 7 | 40 | 0.3 | — |
| 2 | 70 | 25 | 5 | 50 | 0.2 | — |
| 3 | 60 | 30 | 10 | 50 | — | 0.2 |
| 4 | 65 | 30 | 5 | 30 | — | 0.7 |
| 5 | 75 | 20 | 5 | 35 | 0.4 | — |

| Example | Other additives Mold release | Heat-resisting material | Inorganic nucleic agent |
|---|---|---|---|
| 1 | 0.2 | 0.3 | — |
| 2 | 0.2 | 0.3 | — |
| 3 | 0.2 | 0.3 | — |
| 4 | 0.2 | 0.3 | — |
| 5 | 0.2 | 0.3 | — |

| Comparative example | Resin (weight %) A1(1) | A2(2) | A3(3) | Inactive ingredient (weight part) B(4) | C1(5) | C2(6) |
|---|---|---|---|---|---|---|
| 1 | 70 | 23 | 7 | 20 | 0.3 | — |
| 2 | 70 | 23 | 7 | 65 | 0.3 | — |
| 3 | 70 | 23 | 7 | 40 | 0.005 | — |
| 4 | 70 | 23 | 7 | 40 | 1.2 | — |
| 5 | 70 | 23 | 7 | 40 | — | — |
| 6 | 50 | 25 | 25 | 40 | 0.3 | — |
| 7 | 85 | 10 | 5 | 40 | 0.3 | — |
| 8 | 100 | — | — | 40 | 0.3 | — |
| 9 | 75 | 10 | 15 | 40 | 0.3 | — |
| 10 | 75 | 23 | 2 | 40 | 0.3 | — |
| 11 | — | 100 | — | 40 | 0.3 | — |

| Example | Other additives Mold release | Heat-resisting material | Inorganic nucleic agent |
|---|---|---|---|
| 1 | 0.2 | 0.3 | — |
| 2 | 0.2 | 0.3 | — |
| 3 | 0.2 | 0.3 | — |
| 4 | 0.2 | 0.3 | — |
| 5 | 0.2 | 0.3 | talc 1 |
| 6 | 0.2 | 0.3 | — |
| 7 | 0.2 | 0.3 | — |
| 8 | 0.2 | 0.3 | — |
| 9 | 0.2 | 0.3 | — |
| 10 | 0.2 | 0.3 | — |
| 11 | 0.2 | 0.3 | — |

Note:
1) Polyamide-6 resin having a relative mucosity of 2.6;
2) Polyamide-6 resin having a relative mucosity of 3.4;
3) Polyamide-6,6 resin having a relative mucosity of 2.6;
4) Glassfiber whose surface is treated with a aminosilane coupling agent (length: 3 mm, diameter: 10 ~ 15 μm):
5) Sodium di(4-tertiary-butylphenyl)phosphate;
6) 2,2'-methylenebis(4,6-di-tertiary-butylphenyl)phosphate.

EXPERIMENTAL EXAMPLE

Based on the above examples 1~5 and comparative examples, several tests (tensile strength, bending strength, bending modulus of elasticity, impact strength, percentage of molding contraction and gasoline-resisting property) on the injection-molding samples were performed and the results were shown in the following table 2.

Tensile strength was measured by ASTM D638; bending strength and bending modulus of elasticity were measured by ASTM D-790; Impact strength was measured by ASTM D-256 at room temperature (23° C.) with Izod Notched.

The percentage of molding contraction: The percentage of contraction in both flow and rectangular direction is expressed by percentage using a disc sample (thickness: 3.2 mm, diameter: 100 mm).

The gasoline-resisting property indicates the changes in weight after elapse of 8,000 hours after dipping a tensile strength evaluation sample to gasoline.

○ means change in weight (within ±0.5%).

Δ means change in weight (within ±0.5~0.75%), and x means change in weight (more than ±0.75%).

TABLE 2

| Example | Tensile strength (kg/cm$^2$) | Bending strength (kg/cm$^2$) | Bending modulus of elasticity (kg/cm$^2$) |
|---|---|---|---|
| 1 | 2,100 | 3,250 | 109,000 |
| 2 | 2,220 | 3,440 | 137,000 |
| 3 | 2,240 | 3,420 | 138,000 |
| 4 | 2,040 | 2,770 | 89,000 |
| 5 | 2,180 | 2,980 | 97,000 |

| Example | Impact strength (kg · cm/cm) | Percentage of molding contraction (%) | Gasoline-resisting property |
|---|---|---|---|
| 1 | 20 | 0.33/0.51 | ○ |
| 2 | 22 | 0.23/0.37 | ○ |
| 3 | 23 | 0.22/0.38 | ○ |
| 4 | 19 | 0.42/0.61 | ○ |
| 5 | 19 | 0.47/0.66 | ○ |

| Comparative Example | Tensile strength (kg/cm$^2$) | Bending strength (kg/cm$^2$) | Bending modulus of elasticity (kg/cm$^2$) |
|---|---|---|---|
| 1 | 1,520 | 1,900 | 54,000 |
| 2 | 2,170 | 3,410 | 142,000 |
| 3 | 2,080 | 3,180 | 98,000 |
| 4 | 2,120 | 3,270 | 110,000 |
| 5 | 2,040 | 3,220 | 107,000 |
| 6 | 1,840 | 3,110 | 104,000 |
| 7 | 2,090 | 3,130 | 105,000 |
| 8 | 2,060 | 3,100 | 107,000 |
| 9 | 1,980 | 3,180 | 108,000 |
| 10 | 1,990 | 3.120 | 106,000 |
| 11 | 2,040 | 3,130 | 107,000 |

| Comparative Example | Impact strength (kg · cm/cm) | Percentage of molding contraction (%) | Gasoline-resisting property |
|---|---|---|---|
| 1 | 9 | 0.55/0.74 | ○ |
| 2 | 21 | 0.14/0.25 | x |
| 3 | 16 | 0.32/0.50 | Δ |
| 4 | 19 | 0.34/0.52 | ○ |
| 5 | 10 | 0.34/0.52 | x |
| 6 | 13 | 0.35/0.48 | Δ |
| 7 | 17 | 0.35/0.47 | Δ |
| 8 | 17 | 0.36/0.45 | x |
| 9 | 11 | 0.37/0.46 | Δ |
| 10 | 14 | 0.34/0.49 | Δ |
| 11 | 17 | 0.37/0.44 | x |

EXPERIMENTAL EXAMPLE 2

As for the conventional aluminium delivery pipe and a delivery pipe containing the composition obtained from Example 1 of this invention, their comparisons were made in terms of product weight, manufacturing process and productivity. The results were shown in the following table 3.

TABLE 3

|  | Conventional aluminum dye casting delivery pipe | Example 1 |
|---|---|---|
| Specific gravity | 2.80 | 1.46 |
| Produce weight | 280 g | 147 g |
| Manfacturing process | Aluminum dye casting | Injection molding |
| Productivity | — | Extremely superior to aluminium dye casting |

From the above experimental example 1, the polyamide resin composition of this inventionshows better improved mechanical strength and gasoline-resisting property. Further, from the above experimental example 2, the plastic delivery pipe of this invention realized its weight loss by 47 percent over the conventional delivery pipe in metal materials and its shortened processes contributed much to workability.

What is claimed is:

1. Polyamide resin composition formulated by adding a glassfiber and organic nucleating agent to a polyamide resin, wherein it comprises:

25~60 weight part of glassfiber and 0.03~1.0 weight part of organic nucleating agent are contained in proportion to 100 weight part of the polyamide resin comprising 60~70 weight % of polyamide-6 resin having a relative viscosity of 2.2~2.8 at room temperature, 20~30 weight % of polyamide-6 resin having a relative viscosity of 3.2~3.6 and 3~10 weight % of polyamide-6,6 resin having a relative viscosity of 2.5~3.5.

2. Polyamide resin composition according to claim 1, wherein said glassfiber whose surface is treated with a aminosilane coupling agent has its length of 3 mm and diameter of 10~15 μm.

3. Polyamide resin composition according to claim 1, wherein said organic nucleating agent is sodium di(4-tertiary-butylphenyl)phosphate or 2,2'-methylenebis(4,6-di-tertiary-butylphenyl)phosphate.

* * * * *